United States Patent Office 3,829,511
Patented Aug. 13, 1974

3,829,511
PROCESS FOR SEPARATING PERFLUORO-
ALKYLIODIDE TELOMERS
Werner Rudolph, Anderten, Hannover, and Joachim
Massonne, Hannover, Germany, assignors to Kali-
Chemie Aktiengesellschaft, Hannover, Germany
No Drawing. Filed Nov. 4, 1971, Ser. No. 195,838
Claims priority, application Germany, Nov. 7, 1970,
P 20 54 922.8
Int. Cl. C07c 19/08
U.S. Cl. 260—653.1 T                     4 Claims

ABSTRACT OF THE DISCLOSURE

Perfluoroalkyliodide telomers of a chain length of up to 14 carbon atoms are separated and recovered from a mixture of such telomers of a chain length of about 4 to above 20 carbon atoms by adding to the said mixture at a temperature between −10 and +40° C. a solvent selected from the group consisting of aliphatic and cycloaliphatic perhalogeno hydrocarbons of 1–4 carbon atoms and of a boiling point between −10 and 55° C. so as to bring the perfluoroalkyliodide telomers of a chain length up to 14 carbon atoms into solution, then separating the thus-obtained solution from the solid perfluoroalkyliodide telomers of more than 14 carbon atoms and recovering the desired perfluoroalkyliodide telomers by distilling off the solvent.

BACKGROUND OF THE INVENTION

Perfluoroalkyliodide telomers are made by reacting perfluoroalkyliodides of a relatively low molecular weight with perfluoroolefins in the presence of a catalyst. This reaction usually results in a mixture of perfluoroalkyliodides of varying molecular weights. The fraction of the different perfluoroalkyliodides varies as to size and the separation of the individual fractions of the mixture corresponds approximately to Gauss' distribution curve. The products obtained are either liquid, of waxy consistency or solid, depending on the mean degree of telomerization of the telomer mixture. Particularly perfluoroalkyliodide telomers of an intermediate chain length are valuable intermediates for making the corresponding carboxylic acids or alcohols or are converted by reaction with non-fluorine-containing compounds to products which find use as oleophobizing, hydrophobizing or "soil-release" agents, or hydraulic liquids. Perfluoroalkyliodide telomers of a chain length of 8–14 carbon atoms are particularly useful for making intermediates for improvement of textiles. These compounds have the general formula

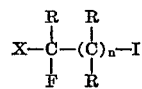

in which X is fluorine, chlorine, bromine or iodine and R is F, CF₃ or C₂F₅ and n is 7–13.

So far, the isolation of such compounds having 8–14 carbon atoms from the total mixture of telomers containing perfluoroalkyliodide telomers of between 4 and more than 20 carbon atoms was effected by lengthy vacuum distillation. In this manner some of the low-boiling compounds can easily be separated. However, a shortcoming of this separation method by distillation is that with the further separation by means of rectification a noticeable thermal decomposition of the desired compounds takes place with the liberation of iodine. Particularly difficult is the separation of the desired telomer fraction from those perfluoroalkyliodide telomers which have a chain length of more than 14 carbon atoms. These compounds have a tendency to sublime. This has the consequence that the distillation apparatus and various ducts are apt to be clogged up. For separating larger amounts of perfluoroalkyliodide telomers of a chain length above 14 carbon atoms, this separation treatment is entirely unsuited.

To avoid these difficulties it has been proposed to keep the fraction of perfluoroalkyliodide telomers of a low degree and of a high degree of telomerization as low as possible. This can be accomplished only if the conversion of telogens during the telomerization is kept lower. In this case in order to obtain high yields of the desired telomers substantial additional apparatus is necessary for this type of telomerization.

SUMMARY OF THE INVENTION

The present invention accordingly rests in a process for separating and recovering perfluoroalkyliodide telomers of a chain length of up to 14 carbon atoms from a mixture of such telomers of a chain length of about 4 to above 20 carbon atoms as is obtained by subjecting perfluoroalkylmono- and diiodides to telomerization in the presence of a catalyst with perfluoroethylene, perfluoropropylene or monochloro derivatives of said ethylene or propylene compounds. The separation and recovery is effected by adding to the said telomer mixture at a temperature between −10 and 40° C. a solvent selected from the group consisting of aliphatic and cycloaliphatic perhalogeno hydrocarbons of 1–4 carbon atoms and of a boiling point between −10 and 55° C. so as to bring the perfluoroalkyliodide telomers of a chain length up to 14 carbon atoms into solution, then separating the thus-obtained solution from the solid perfluoroalkyliodide telomers of more than 14 carbon atoms and recovering the desired perfluoroalkyliodide telomers by distilling off the solvent.

DESCRIPTION OF THE PREFERRED EMBODIMENTS

The method of the invention is based on the surprising fact that the mentioned perhalogeno hydrocarbons constitute excellent solvents for telomers of a chain length up to 14 carbon atoms. On the other hand, compounds with a chain length above 14 carbon atoms are subject to only very little solution or are not dissolved at all. After separating these easily sublimed perfluoroalkyliodide telomers it is necessary to separate the remaining telomers in the solvent as desired by fractional distillation. The telomers which are of no interest for further processing, for instance those perfluoroalkyliodides having 4 and 6 carbon atoms can be separated out, and the fraction with 8–14 carbon atoms can be obtained with a high degree of purity. If necessary, this fraction can then be further separated. A loss of telomers can be avoided by recycling the short-chain telomers into the telomerization reaction and thus using them as further starting material for the desired telomers.

Solvents which are useful for the extraction are particularly aliphatic and cycloaliphatic perhalogeno hydrocarbons which have a boiling point between −10 and 50° C. Such hydrocarbons are for instance CF₂ClBr, CF₂Br₂, CFCl₃, C₂F₄Br₂, C₂F₃Cl₃, C₃F₆Cl₂, C₄F₉Br or octafluorocyclobutane. The reaction of the telomer mixture is preferably carried out at room temperature, the perhalogeno hydrocarbons having a boiling point between 25 and 50° C. are the preferred solvents.

Particularly suitable have been found to be the 1,1,2-trifluorotrichloroethane and the symmetric tetrafluorodibromoethane. These two compounds have particularly good selection properties. Because of their favorable boiling point they can be used at room temperature without undue loss. The boiling points of these compounds are in addition sufficiently beneath those of the perfluoroalkyliodide telomers to permit a simple recovery of the solvent.

Perhalogeno hydrocarbons with a boiling point above 55° C. are not useful for the extraction, since they cannot be separated from the lower telomers. Halogeno hydrocarbons which contain hydrogen are likewise not useful for the process of the invention, since they give rise to side reactions when residues thereof are recycled together with the lower telomers into the telomerization reaction.

To carry out the extraction the mixture of perfluoroalkyliodide telomers is reacted and mixed in a stirring vessel with the extracting agent, for instance trifluorotrichloroethane. After a short time, all perfluoroalkyliodide telomers up to a chain length of 14 carbon atoms go into solution. The thus-formed suspension is then filtered by using suitable filtration devices, for instance a pressure filter. Separation of the solvent and of the lower perfluoroalkyliodide telomers can easily be effected by distillation, since the obtained filtrate contains only a few percent of the higher perfluoroalkyliodide telomers which readily sublime. The compound can also be subjected to fractional distillation.

In general, it is preferred to distill off all of the solvent and lower perfluoroalkyliodides by means of slow heating to the necessary temperature and then in a second distillation stage to separate the obtained distillate in a column apparatus into solvent and perfluoroalkyliodide telomers. In this manner, individual telomer fractions can be obtained of a high degree of purity.

The bottom product obtained by distilling off the solvent and the lower perfluoroalkyliodide telomers contains principally telomers of an intermediate chain length. By subsequent vacuum distillation, this product can then be subjected to further purification. The process described can be carried out in a continuous and automatic operation. The process accordingly permits a separation of the telomers and is particularly economical since it permits the almost complete recovery and recirculation of the lower telomers into the telomerization reaction.

The following examples will further illustrate the invention. The determination of the perfluoroalkyliodide telomers in the crude product of telomers and the fractions obtained by separation of the telomerization product was effected by means of gas-chromatography and mass-spectroscopy.

Example 1

The polymer mixture in this example was obtained by telomerization of pentafluoromonoiodoethane with tetrafluoroethylene in an autoclave. The mixture of perfluoroethyliodides thus obtained had the formula $$CF_3(CF_2)_nI$$

and the composition shown in Table 1. The mixture therefore contained perfluoroethyliodide telomers wherein $n$ was between 3 and 21.

100 wt.-parts of this mixture were introduced into a glass vessel provided with a stirrer with 250 wt.-parts of 1,1,2-trifluorotrichloroethane and subjected to stirring for 30 minutes. The thus-obtained turbid suspension was then filtered by means of a pressure filter. The filter cake was washed with 1,1,2-trifluorotrichloroethane and subjected to drying. The filter cake principally contained telomers of a chain length of 16 carbon atoms and above. The composition of the filter residue appears from Table 1.

The solvent and the lower telomers were then distilled off from the obtained filtrate to which a washing solution had been added. This was carried out in the first distillation stage at a flask temperature of 120° C. The distillate was collected in a condenser. The bottom product of this first distillation stage was removed from the flask while still hot and then subjected to cooling.

There was thus obtained a white product which principally contained the desired telomers of a chain length between 8 and 14 carbon atoms (residue I). The fraction of lower and higher telomers amounted only to a few percent. A further purification of the residue I from these undesired products was obtained by a subsequent vacuum distillation (see Table 1).

The distillate obtained in the first distillation stage was immediately subjected to a fractional distillation in a second distillation stage in which a flask temperature of 60° C. was reached. This step was carried out in a three-neck flask provided with a fractionating column and a condenser. The extractant was recovered as the head product of the second distillation stage at a degree of purity of 96.2%. The residue which remained in the distillation flask contained principally short-chain perfluoroethyliodide telomers (residue II). This telomer mixture could therefore be reintroduced into the starting mixture for the telomerization reaction without further distillative separation.

TABLE 1

| Perfluoroethyl-iodide $CF_3(CF_2)_nI$ | Starting mixture, weight percent | Filter residue, weight percent | Residue I Weight percent | Residue I After vacuum distillation, weight percent | Residue II, weight percent |
|---|---|---|---|---|---|
| $n=3$ | 7.5 | | | | 34.3 |
| $n=5$ | 14.3 | | 3.0 | 0.5 | 54.8 |
| $n=7$ | 15.9 | | 19.7 | 24.7 | 9.6 |
| $n=9$ | 25.1 | | 35.5 | 41.6 | 1.0 |
| $n=11$ | 21.0 | | 29.9 | 26.7 | 0.2 |
| $n=13$ | 6.7 | | 9.1 | 5.3 | 0.1 |
| $n=15$ | 3.9 | 29.1 | 2.3 | 1.2 | |
| $n=17$ | 3.6 | 40.0 | 0.5 | 0.2 | |
| $n=19$ | 2.3 | 28.2 | | | |
| $n=21$ | 0.2 | 2.0 | | | |
| Amount distribution in fractions obtained (parts by weight) | 100 | 8 | 70 | | 22 |

Example 2

100 wt.-parts of a mixture of perfluoroethyliodide telomers, as described in Example 1 (see specifically Table 2), were stirred for 30 minutes at room temperature with 250 wt.-parts of symmetric tetrafluorodibromoethane. The thus obtained suspension was filtered by means of a pressure filter. The obtained filter residue contained perfluoroethyliodide telomers of a chain length between 16 and 22 ($n=15$ to 21).

The solvent and the lower perfluoroethyliodide telomers were separated from the filtrate in the first distillation stage at 120° C. The residue I contained only a few percent of telomers with 6 or above 14 carbon atoms.

The solvent was removed by fractional distillation from the filtrate of the first distillation stage. The resulting residue II consisted of about 89 wt.-percent perfluoroethyliodide telomers having 4 and 6 carbon atoms and could therefore be readily reintroduced into the telomerization reaction.

TABLE 2

| Perfluoroethyl-iodide $CF_3(CF_2)_nI$ | Starting mixture, weight percent | Filter residue, weight percent | Residue I, weight percent | Residue II, weight percent |
|---|---|---|---|---|
| $n=3$ | 7.5 | | | 34.3 |
| $n=5$ | 14.3 | | 2.8 | 54.6 |
| $n=7$ | 15.9 | | 18.8 | 9.6 |
| $n=9$ | 25.1 | | 35.7 | 1.2 |
| $n=11$ | 21.0 | | 30.2 | 0.3 |
| $n=13$ | 6.7 | | 9.3 | 0.1 |
| $n=15$ | 3.9 | 24.7 | 2.3 | |
| $n=17$ | 3.6 | 39.2 | 0.9 | |
| $n=19$ | 2.3 | 33.2 | | |
| $n=21$ | 0.2 | 2.9 | | |
| Amount distribution in fractions obtained (parts by weight) | 100 | 8 | 70 | 22 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A process for separating and recovering a fraction of perfluoroalkyl iodide telomers having chain lengths of up to 14 carbon atoms from a mixture of telomers having the formula

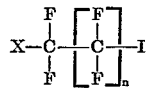

in which X is fluorine, chlorine, or iodine, and $n$ represents integers between 3 and 21, which process comprises:

(a) adding to the said mixture of telomers at a temperature between —10 and 40° C. a solvent of the group consisting of $CF_2ClBr$, $CF_2Br_2$, $CFCl_3$, $C_2F_4Br_2$, $C_2F_3Cl_3$, $C_3F_6Cl_2$, $C_4F_9Br$ and octafluorocyclobutane, and vigorously stirring the said mixture and solvent so as to dissolve in the solvent the fraction of the said telomers having chain lengths of up to 14 carbon atoms, (b) separating the formed solution from the solid perfluoroalkyl iodide telomers having more than 14 carbon atoms and (c) recovering the said fraction of telomers having chain lengths of up to 14 carbon atoms from the solution by distilling off the solvent therefrom.

2. A process as defined in claim 1 in which the recovered fraction of telomers having chain lengths of up to 14 carbon atoms is subsequently separated by fractional distillation into individual fractions.

3. A process as defined in claim 1 in which the recovered fraction of telomers having chain lengths of up to 14 carbon atoms is distilled at temperatures up to 120° C. to expel therefrom the telomers having chain lengths of up to 6 carbon atoms and subsequently distilling the residue from the said distillation under reduced pressure to recover a fraction of telomers having chain lengths of from 8 to 14 carbon atoms in a high degree of purity.

4. A process as defined in claim 1 in which the solvent is 1,1,2-trifluorotrichloroethane or symmetrical tetrafluorodibromoethane.

References Cited

UNITED STATES PATENTS

| | | | |
|---|---|---|---|
| 2,885,448 | 5/1959 | Miller | 260—653.1 T |
| 2,830,097 | 4/1958 | Galvin et al. | 260—653.1 T |
| 2,875,253 | 2/1959 | Barnhart | 260—653.1 T |

OTHER REFERENCES

Miller, Jr., et al., Ind. and Eng. Chem. *39*, 333–337 (1947).

HOWARD T. MARS, Primary Examiner

J. A. BOSKA, Assistant Examiner